UNITED STATES PATENT OFFICE.

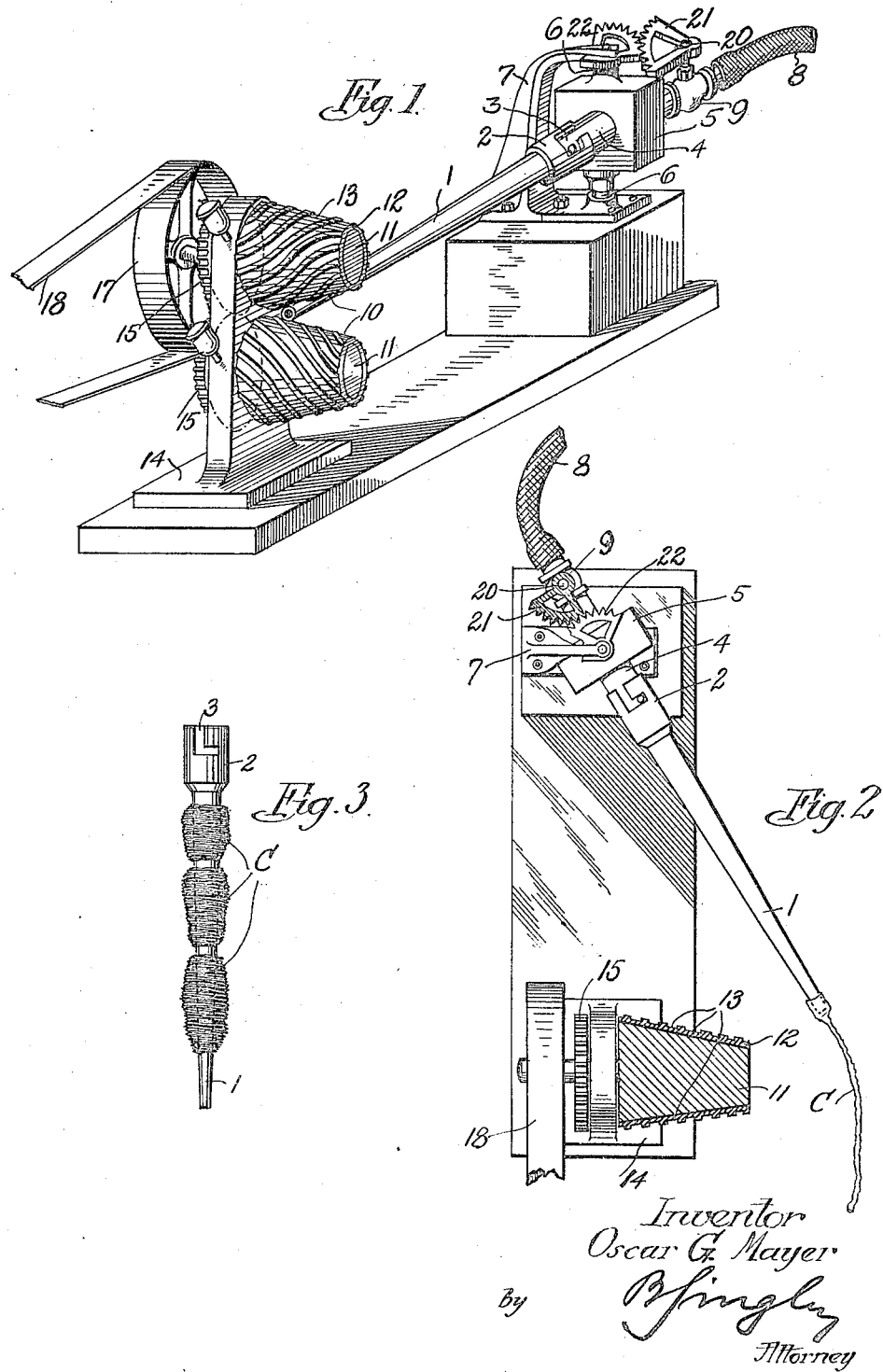

OSCAR GOTTFRIED MAYER, OF CHICAGO, ILLINOIS.

MACHINE FOR THE TREATMENT OF SAUSAGE-CASINGS.

1,302,194.	Specification of Letters Patent.	Patented Apr. 29, 1919.

Application filed August 20, 1918. Serial No. 250,759.

*To all whom it may concern:*

Be it known that I, OSCAR G. MAYER, a citizen of the United States, residing at Beethoven Place and Sedgwick street, in the city of Chicago, in the county of Cook, State of Illinois, United States of America, have invented certain new and useful Improvements in Machines for the Treatment of Sausage-Casings, of which the following is a specification.

The invention relates to a machine for the treatment of sausage casings.

In the manufacture of sausages it has been customary to soak the casings prior to the operation of stuffing, and also to flush their interior before they were stuffed. In the operation of flushing the casings were placed on a faucet or tap and water was conveyed through the same. The flushed casings, in loose and wrinkled up condition, were then taken to a sausage stuffing machine, where the end of each casing was first placed over a nozzle and gradually the entire casing pulled in many layers over the nozzle,—an operation which is possible, owing to the flexibility of the material of which these casings are composed. After the entire casing had been placed on the nozzle of the stuffing machine, the stuffing was forced into the casing, and by its entrance into the end of the casing also gradually and proportionately removed the entire casing from the nozzle.

It is an object of the present invention to provide a machine in which the operation of flushing and the operation of placing the casing on a nozzle preparatory to the stuffing of the same may be combined.

Another object of the invention is to provide a nozzle or spindle on which a plurality of casings may be brought up successively, whereby upon transfer of this charged nozzle from the flushing machine to the stuffing machine, the various casings may successively be stuffed.

Another object of the machine is to perform the operation of placing the casing on the nozzle mechanically instead of effecting it by hand, as it has been done up to the present time.

It is also an object of the invention to effect the feeding of the casings upon the nozzle or spindle simultaneously with the flushing of the same, and to advance the casing onto the nozzle by a pushing action rather than by a pulling action.

Other objects of the invention will be more fully understood by reference to the following specification and to the accompanying drawings, wherein—

Figure 1 is a perspective view of the machine;

Fig. 2 is a partly top plan view and partly section of the machine, certain parts being shown in a different position, and Fig. 3 shows, in top plan view, one of the nozzles or spindles charged with a plurality of casings ready for transfer to the stuffing machine.

The machine comprises a hollow spindle 1, tapering in one direction and having at one end a sleeve 2, which is provided with a bayonet slot 3, whereby this spindle may be detachably connected with a stud 4 of a spindle support 5. This spindle support is constructed as a hollow housing, and is provided with trunnions 6, through which the casing is pivotally carried in a bracket 7, the axis of pivotal support being at a right angle to the axis of the spindle 1. The interior of the housing 5 may be supplied with a flushing fluid through a hose 8, which has its ends attached to a valve 9 fixed to the housing 5.

As a mechanical means for placing a sausage casing C over this spindle or nozzle 1, the device includes, in opposition to the free end of the spindle, means which frictionally engage the casing, the end of which may be placed by hand over the end of the spindle. The rotary means are shown as a pair of rollers 10 which push, through frictional contact, portions of the casing onto the spindle, and which, owing to the continued travel enforced by this frictional contact of the rotary means, successively cause the advance of different portions of the casing C into operative engagement with the rollers. These rollers project at a right angle to the spindle and comprise each a conical core 11 and a jacket 12, preferably made of rubber and provided with a plurality of friction enhancing corrugations and grooves 13 extending helically around the circumference of the jackets 12. The tapering rollers are supported near their enlarged ends in a casting 14 and carry at the opposite side of this casting gears 15, which are in engagement with each other. The shaft of one of these rollers is extended beyond said gears and carries a pulley 17, whereby the entire machine may be driven through a belt 18 or the like. The core 11 of the rollers preferably is made of light material as wood, as they are supported at one end only.

It will be seen that in operative position, as shown in Fig. 1, the rollers contact the spindle 1 (or casing) at diametrically opposite points, and that the axes of the rollers are located at a right angle to the axis of the spindle and one above the other. As the reduced ends of the rollers are not supported, the arrangement is adapted to permit a swinging movement of the axis of the spindle in a plane parallel to the axis of the rollers, as shown in Fig. 2, so that in this position of the spindle the end of a casing may be pulled over the end of the spindle.

The stem 20 of the valve 9 may carry detachably a toothed sector 21, which is secured against rotation thereon, and which is in mesh with a stationary toothed sector 22 carried by the bracket 7 of the spindle support 5. It is obvious, therefore, that upon swinging the spindle from the position shown in Fig. 1 to the position shown in Fig. 2 the valve stem 20 will be caused to rotate, whereby the position of the valve is altered.

In the position shown in Fig. 1 the valve 9 permits the passage of the flushing fluid through the support 5 into the spindle 1, and that in the position indicated in Fig. 2 the valve is shut against the passage of the fluid.

The swinging movement of the spindle can be effected owing to the fact that the rollers 11 are supported at one end only, and it is not necessary to interrupt the drive of these rollers when the spindle is moved to inoperative position. When the spindle is swung back in the position shown in Fig. 1, the valve 9 will immediately be opened to permit the flushing fluid to enter the spindle and into the casing C attached thereto. At the same time the rollers will positively and gradually advance, by a pushing action, the entire casing on the spindle. After the entire length of casing has been brought up on the spindle, the bulk of the casing may be pushed inwardly by hand toward the rear end, and another casing may then be placed with its end on the spindle 1 after the same has again been swung into the position shown in Fig. 2. This being effected without necessarily interrupting the drive, the spindle is again returned to operative position, and the second casing is pushed completely on the spindle until it forms a bulk, as shown in Fig. 3, etc. After the spindle is entirely charged with casings in this manner, it is removed from the stud 4 through a slight rotation and axial withdrawal, and the charged spindle is then placed on a similar stud of the sausage stuffing machine. Here the operation is in no way altered from the ordinary operation, in which the meat is forced under pressure into the casing, while at the same time the casing is again pushed off the nozzle of the machine.

I claim:

1. In a machine for treating sausage casings, a hollow spindle for the casing, a hollow movable support for the spindle, means for connecting the interior of the hollow support with the interior of the hollow spindle, means for supplying flushing fluid to the hollow support, and positively actuated means for gradually placing at the same time the casing onto the spindle, said actuating means permitting removal of said spindle.

2. In a machine for treating sausage casings, a hollow spindle, a hollow support with the interior of which one end of the spindle is in communication, means for supplying the interior of the spindle with flushing fluid, means for gradually advancing a casing from one end toward the other end of the spindle, and means for pivotally carrying said support.

3. In a machine for treating sausage casings, a hollow spindle, a hollow movable support, the interior of the support communicating with the interior of the spindle at one end thereof, positively actuated means for advancing a sausage casing from the other end of the spindle toward the first named end, and means for pivotally supporting said support on an axis perpendicular to the axis of the spindle to permit withdrawal from said actuating means.

4. In a machine for treating sausage casings, a hollow spindle supported at one end thereof, a pair of rollers adjacent the other end thereof, and means for driving said rollers, the other end of the spindle being adapted to project between said rollers.

5. In a machine for treating sausage casings, a hollow spindle, means for pivotally supporting the hollow spindle at one end thereof, a pair of rollers adjacent the other end thereof and adapted to contact said spindle at diametrically opposite points and means for driving said rollers.

6. In a machine for treating sausage casings, a spindle, means for supporting the spindle at one end, and a pair of rollers contacting with the other end of the spindle at diametrically opposite points thereof, said rollers having their axes parallel and being tapering in the same direction.

7. In a machine for treating sausage casings, a spindle, a pair of rollers contacting with one end of the spindle at diametrically opposite points thereof, said rollers tapering in the same direction and being supported at their enlarged end, the reduced end of said rollers being free of supports.

8. In a machine of the character described, a spindle, a pair of rollers contacting with said spindle at diametrically opposite points thereof, and a support for said rollers, said support being adapted to permit of swinging movement of said spindle out of the interspace between said rollers.

9. In a machine of the character described, a spindle, a pair of conical rollers, a conical rubber jacket fitted to each of said rollers, and means for positively actuating both of said rollers, said jackets being in simultaneous frictional contact with one end of said spindle at diametrically opposite points thereof.

10. In a machine of the character described, a spindle, a pair of rollers, conical jackets fitted on said rollers, said jackets being provided with a plurality of grooves, and means for actuating both of said jackets in opposite direction while in contact with the spindle.

11. In a machine of the character described, a spindle, a pair of conical rollers supported at one end and in contact with the spindle, and means for positively actuating said rollers, said rollers being provided with helical grooves on the outer surface thereof.

12. In a machine of the character described, a spindle, a pair of rollers contacting the free end of the spindle and permitting withdrawal of said spindle from the interspace between said rollers by swinging movement of the spindle, means for supplying flushing fluid to the interior of the spindle, and means for automatically interrupting said fluid supply upon removal of the spindle from operative position.

13. In a machine of the character described, a hollow spindle, a hollow support, means connecting the interior of the spindle with the interior of the hollow support, a stationary bracket in which said hollow support is pivotally carried, means for supplying flushing fluid to said hollow support, means for gradually pushing a casing in axial direction over said spindle, and means secured to said bracket for automatically interrupting the fluid supply to said hollow support when said spindle is moved to inoperative position.

In witness whereof I affix my signature.

OSCAR GOTTFRIED MAYER.

Copies of this patent may be obtained for five cents each, by addressing the "Commissioner of Patents, Washington, D. C."